United States Patent [19]
Aiyoshizawa et al.

[11] Patent Number: 5,357,162
[45] Date of Patent: Oct. 18, 1994

[54] SPINDLE MOTOR USING DYNAMIC PRESSURE BEARINGS

[75] Inventors: Shunichi Aiyoshizawa, Tokyo; Kazuto Hirokawa; Kazuyuki Kasahara, both of Kanagawa; Tohru Maruyama, Kanagawa, all of Japan

[73] Assignee: Ebara Corporation, Tokyo, Japan

[21] Appl. No.: 22,134

[22] Filed: Feb. 25, 1993

[30] Foreign Application Priority Data

Feb. 28, 1992 [JP] Japan .................. 4-78374

[51] Int. Cl.$^5$ .................. H02K 5/16; H02K 7/08; F16C 32/06
[52] U.S. Cl. .................. 310/90; 384/112
[58] Field of Search .................. 310/90; 384/107, 112, 384/292, 291

[56] References Cited

U.S. PATENT DOCUMENTS 3,950,039  4/1976  Huber et al. .
4,984,881  1/1991  Osada et al. .
5,127,744  7/1992  White et al. .
5,142,173  8/1992  Konno et al. .

FOREIGN PATENT DOCUMENTS 3-256546  11/1991  Japan .

OTHER PUBLICATIONS

Osada et al., "Spiral Groove Ceramic Bearings and Their Application to Products", *Ebara Engineering Review*, No. 143, pp. 19-20, Apr. 1989 & partial translation thereof.

*Primary Examiner*—Kristine L. Peckman
*Assistant Examiner*—E. To
*Attorney, Agent, or Firm*—Wenderoth, Lind & Ponack

[57] ABSTRACT

A spindle motor with an H-type pneumatic dynamic bearing has a high durability against repeated starts and stops of rotation. The H-type bearing is composed of a radial bearing member, thrust plates firmly fixed to opposite ends of the radial bearing member and a cylindrical radial sleeve, which form a radial pneumatic dynamic bearing and thrust pneumatic dynamic bearings. A stator core is fixedly secured around a rotary member, which is in turn fixedly secured around the cylindrical radial sleeve. A total thrust clearance $a+a'$ of the thrust bearings is represented by an inequality of $(a+a')/A < 2.5/10^4$ based on a sliding surface diameter A of each thrust plate, a and total radial clearance $b+b'$ of the radial bearing is represented by an inequality of $(b+b')/B < 5/10^4$ based on a sliding surface diameter B of the radial bearing member.

8 Claims, 14 Drawing Sheets

POSITION $x$ OF RADIAL SLEEVE AS MEASURED FROM UPPER THRUST PLATE
THRUST FORCE EXERTED ON RADIAL SLEEVE DURING ROTATION OF SPINDLE MOTOR ($a+a'=3\mu m$)

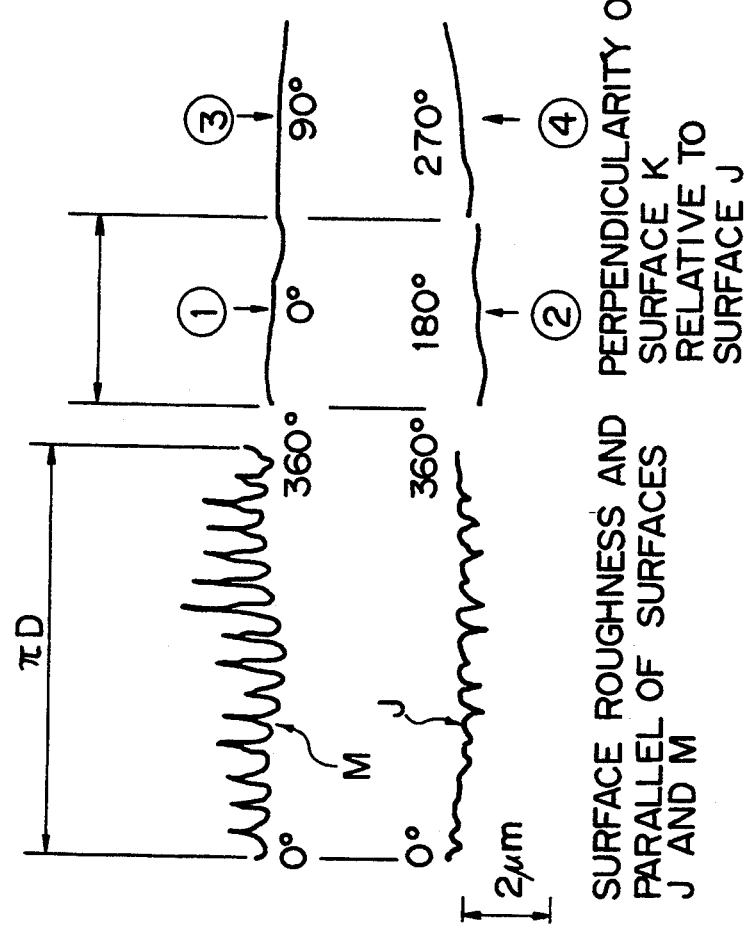
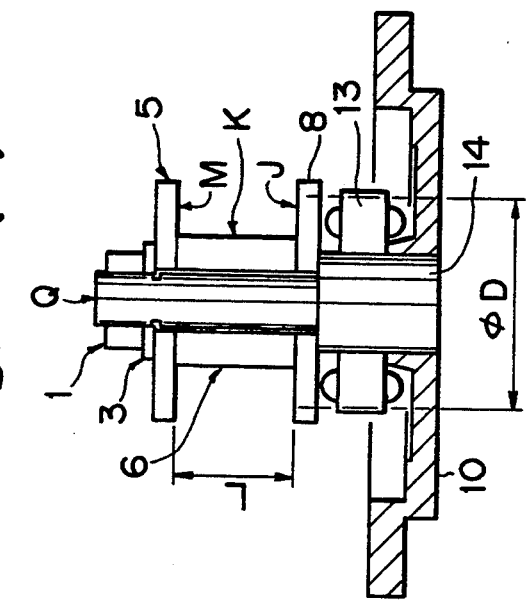
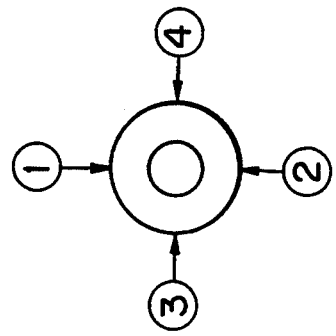

SURFACE ROUGHNESS OF SURFACE E

SURFACE ROUGHNESS OF SURFACE E

PERPENDICULARITY OF SURFACE E
RELATIVE TO SURFACE F

PERPENDICULARITY OF SURFACE E
RELATIVE TO SURFACE F

A: DIAMETER OF SURFACE ON THRUST PLATE

B: DIAMETER OF SURFACE ON RADIAL BEARING MEMBER

SPINDLE MOTOR USING DYNAMIC PRESSURE BEARINGS

BACKGROUND OF THE INVENTION

1. Field of the Invention

The present invention relates generally to a spindle motor including a radial bearing and a thrust bearing, both of which are designed in the form of a pneumatic dynamic pressure bearing. More particularly, the present invention relates to a spindle motor of the foregoing type which generates few vibrations during rotation, stands well against shocks imparted thereto from the outside, and exhibits an excellent durability against repeated rotational starts and stops of the spindle motor.

2. Prior Art

FIG. 7 is a fragmentary sectional view of a conventional spindle motor for a hard disc driver (hereinafter referred to simply as an HDD), wherein the left-hand side of the drawing is a vertical sectional view. Referring to FIG. 7, the spindle motor includes a shaft support sleeve 22 which stands upright from a mounting board 21 along a center axis of the spindle motor. A stator coil 23, which consists of a plurality of coils, is fixedly arranged around the outer circumferential surface of the shaft support sleeve 22, and a rotary shaft 25 is rotatably supported around the inner circumferential surface of the shaft support sleeve via ball bearings 24. A support member 27 for fixedly mounting a hard disc thereon is fixedly secured to the upper end Of the rotary shaft 25. A rotor magnet 28 is fixedly secured to the inner circumferential side of the support member 27 facing the stator coil 28. The rotor magnet 28 consists of a multiplicity of radial magnets and is formed in a ring shape.

The magnitude of each vibration induced by the spindle motor having the ball bearings 24 is determined depending on a gap of each ball bearing 24. Specifically, the magnitude of vibration as measured in the radial direction is substantially equal to the radial gap of each ball bearing 24, while the magnitude of vibration as measured in the thrusting direction is substantially equal to the thrust gap of each ball bearing 24. To reduce each of the foregoing gaps, a measure of applying a certain preload to the ball bearings has been hitherto taken. In this case, run-out (oscillation) of each bal bearing 24, as measured in the radial direction is about 0.5 $\mu$m in terms of a non-repetition component of the vibration, which fails to exhibit a satisfactory value. When the preload is applied to the ball bearings 24 in that way, the motor torque increases, but this contradicts with the requirement for allowing each HDD to consume a small amount of electricity. For this reason, as far as the ball bearings 24 are used for the spindle motor, it is practically impossible to reduce the magnitude of each vibration induced by the spindle motor much more than the foregoing value.

In addition, a proposal has been made of a spindle motor of the type having a dynamic pressure bearing employed therefor to satisfactorily meet the requirement of exhibiting excellent rotational properties with a high accuracy. FIG. 8 is a sectional view of a conventional spindle motor having a dynamic pressure bearing. Referring to FIG. 8, the spindle motor includes a support shaft 32 which stands upright on a mounting board 31 at the central part thereof. An annular thrust bearing plate 33 is immovably placed on the mounting board 31, and a cylindrical radial bearing member 34 is firmly fitted onto the support shaft 32 in the concentric relationship relative to the support shaft 32. A stator coil 35 is fixedly secured around the support shaft 32 at the positions located below the annular radial bearing member 34 in an equally spaced relationship. On the other hand, a holding member 36 is designed with cap-shaped configuration and its ceiling portion is freely rotatably fitted onto the support shaft 32 at the upper end part of the latter.

A cylindrical radial sleeve 39 is fixedly secured to the inner circumferential surface of the holding member 36 at the central part of the latter, while an annular thrust plate 37 is fixedly fitted to the lower end part of the holding member 36. The inner circumferential surface of the radial sleeve 39 faces the radial bearing member 34 to form a radial dynamic pressure bearing therebetween having a number of herringbone-shaped grooves, while the lower surface of the thrust plate 37 faces the upper surface of the thrust bearing plate 33 to form a thrust dynamic pressure bearing therebetween having a number of spiral grooves formed thereon. A rotor magnet 38 is fixedly secured around the inner circumferential surface of the holding member 36 in an equally spaced relationship at positions located opposite to the stator coil 35.

When the stator coil 35 in the spindle motor constructed in the above-described manner is sequentially activated with an electric current, the holding member 36 having the rotor magnet 38 starts to rotate, whereby a thrust pneumatic dynamic pressure bearing is formed between the upper surface of the thrust bearing plate 33 and the lower surface of the thrust bearing plate 37, while a radial pneumatic dynamic pressure bearing is formed between the outer circumferential surface of the radial bearing member 34 and the inner circumferential surface of the radial sleeve 39. Since the thrust plate 37 and the radial sleeve 39 are borne by the dynamic pressure bearings without any direct contact not only between the thrust bearing plate 33 and the thrust bearing plate 37, but also between the radial bearing member 34 and the radial sleeve 39, the spindle motor can smoothly cope with high speed rotation as compared with the aforementioned conventional spindle motor of the type having ball bearings.

Problems to be solved by the Invention

As is apparent from the above description, a spindle motor is required to exhibit excellent rotational properties with high accuracy, and moreover, it should maintain these properties during rotation thereof no matter how shock is imparted to it from the outside. For this reason, it is necessary that the rigidity (bearing rigidity) of an air film formed over each bearing portion is preferably set% to be equal to that of the ball bearing which has been hitherto practically used or set to about ⅓ of that of the conventional ball bearing.

A method of increasing the working rotational speed of a spindle motor and a method of reducing a bearing clearance can be noted as typical means for improving the rigidity of a weak dynamic pressure bearing. Employment of the first-mentioned method is specified by a user, and there is seen a tendency for the rotational speed of the spindle motor to increases year by year. However, the present status is such that the rotational speed of the spindle motor is set to about 3,600 to 8,000 rpm at present, which is not fully satisfactory for the user as a means for improving the rigidity of the dynamic pressure bearing. On the other hand, the last-mentioned method has a possibility in that it serves as an effective means for improving the rigidity of the dynamic pressure bearing. FIG. 9 is a diagram which shows, by way of three characteristic curves, the relationship of bearing rigidity relative to a ratio of the clearance (b+b') of each of three kinds of spindle motors for HDD to the diameter B of a sliding portion in the spindle motor, wherein a characteristic curve (1) represents the case that the dynamic pressure bearing of a spindle motor has a diameter of 5.25", a characteristic curve (2) represents the case that it has a diameter of 3.5" and a characteristic curve (3) represents the case that it has a diameter of 2.5". It should be noted that these characteristic curves are shown while $\frac{1}{3}$ of the rigidity of each ball bearing generally used for the aforementioned three kinds of spindle motors is taken as a reference value 1 and that the rotational speed of each of the dynamic pressure bearings used for conducting calculations for preparing the characteristic curves was 3,600 rpm, which speed is generally employed for spindle; motors at present.

As is apparent from FIG. 9, to assure that a bearing rigidity of about $\frac{1}{3}$ of that of conventional ball bearing is obtained with the dynamic pressure bearing at a rotational speed of 3,600 rpm which is comparatively low as a pneumatic dynamic pressure bearing, it is necessary that an inequality of $(b+b')/B < 5/10^4$ is substantially equally established for the three kinds of ball bearings each having a different diametrical size. For example, with the characteristics curve (3) shown in FIG. 9, it is 6 necessary that when the diameter B is set to 9 mm, the clearance (b+b') is dimensloned to be less than 0.0045 mm, i.e., 4.5 μm as represented by an inequality of (b+b')<0.0045 mm. In the case that the spindle motor is constructed as shown in FIG. 8, the thrust bearing plate 33 serving as a bearing member on the stationary side is operatively connected to the radial bearing portion 34 by way of the mounting board 31 and the support shaft 32, while the thrust bearing 37 on the rotational side is assembled with the radial sleeve 39 by way of the holding member 36. An adhesive was used to connect them.

FIG. 10 shows illustrative views each of which illustrates results derived from measurements conducted for determining the perpendicularity of the outer circumferential surface of the radial bearing member 34 relative to the upper surface of the thrust bearing plate 33 after completion of an assembling operation. FIG. 10(a) is a schematic sectional view of an assembly consisting of the mounting board 31 and the support shaft 32, FIG. 10(b) is a schematic plan view of the radial bearing member 34, FIG. 10(c) shows surface roughness of an upper surface E of a sample of thrust bearing plate 33, FIG. 10(d) shows the surface roughness of an upper surface E of another sample of thrust bearing plate 33, FIG. 10(e) shows the perpendicularity of an outer circumferential surface F of the radial bearing member 34 perpendicularly measured relative to the surface E of the thrust bearing plate 33 shown in FIG. 10(c). and FIG. 10(f) shows the perpendicularity of an outer circumferential surface F of the radial bearing member 34 measured perpendicularly relative to the surface E of the thrust bearing plate 33 shown in FIG. 10(d).

In FIG. 10(e) and FIG. 10(f), several saw tooth-shaped portions are recognized at opposite ends of a radial length L, and each of them shows by way of sectional view a groove for generating a dynamic pressure. Referring to FIG. 10 again, for example, with the thrust bearing plate 33 shown in FIG. 10(c) and FIG. 10(e), the outer circumferential surface F of the same is inclined based on true perpendicularity by a quantity of 15 μm within the range of an axial length L in the direction represented by numerals (1) and (2) in FIG. 10(b). Similarly, with the sample of thrust bearing plate 33 shown in FIG. 10(d) and FIG. 10(f), the outer circumferential surface of the same is inclined by a quantity of 18 μm in the direction represented by numerals (1) and (2), while it is inclined by a quantity of 14 μm in the direction represented by numerals (3) and (4). In this case, an absolute value of inclination is the square root of $(18^2+14^2)$, i.e., 22.8 μm.

to Referring FIG. 10 again, a practical spindle motor is constructed such that members assembled on the stationary side are combined and assembled with members assembled on the rotary side as shown in FIG. 8. For example, in case that the outer circumferential surface F of the radial bearing member 34 is perpendicularly inclined relative to the upper surface E of the thrust bearing plate 33 after completion of an assembling operation as shown in FIG. 10(c) and FIG. 10(e), to assure that the radial bearing plate 34 and the opponent member of rotatable thrust plate 37 are assembled with each other while the sliding surface of the thrust plate 37 is uniformly brought in contact with the surface E of the thrust bearing plate 33, the inner diameter of the radial sleeve 39 on the rotary side should be enlarged to such an extent that the thrust plate 37 does not locally contact the thrust bearing plate 33 even though the radial bearing member 34 is inclined as shown in FIG. 10(e). Specifically, the radial sleeve 39 becomes short in rigidity unless the inner diameter of the radial sleeve 39 is dimensioned to be smaller than the outer diameter F of the radial bearing member 34 by a quantity of 4.5 μm or less. In practice, however, an assembling operation can not be achieved by any means unless the inner diameter of the radial sleeve 39 is dimensioned to be larger than the outer diameter F of the radial bearing member 34 at least by a quantity of (18+18) μm, i.e., 36 μm. In addition, due to the fact that the bearing rigidity is substantially in proportion to the square root of a clearance between two opponent members, the desired bearing rigidity can not be obtained with the spindle motor constructed in the above-described manner.

Of course, the accuracy for assembling the support shaft 32 with the mounting board 31 is an important factor, but excellent assembling accuracy cannot be obtained with the aforementioned spindle motor due to factors such as the irregularity of shrinkage of adhesive layers G and H in the course of curing and similar factors. Therefore, the present status is such that a radial clearance is enlarged so as to absorb the foregoing inclination, and moreover, each spindle motor is practically used with a property of rigidity much lower than the desired one.

With the bearing structure as shown in FIG. 8, since the bearing can support a thrust load only in a single direction, the force generated by the thrust bearing during rotation of the spindle motor is equal to the weight of a rotating assembly, and there is no possibility that the former is larger than the latter. Although the bearing rigidity is represented by a function including a force generated by the spindle motor and a quantity of floatation of the thrust bearing and associated components as parameters, to assure that the rigidity of the thrust bearing is equalized to that of each of the hitherto used ball bearings, the weight of a rotor should be enlarged as much as several times that of a conventional rotor so as to reduce the quantity of floatation of the rotor, but this is impossible because of various circumstances. For this reason, a predetermined bearing rigidity has been hitherto obtained by applying a preload to the thrust bearing in the opposite direction to the direction of generation of the dynamic pressure for the thrust bearing.

With the conventional thrust bearing, however, problems arise that since a thrust load to be borne by it prior to rotation of the spindle motor is excessively large, the spindle motor can not start its rotation, and moreover, reliability of the durability against repeated starts and stops of rotation of the spindle motor is remarkably degraded. To cope with the foregoing problems, an H-type bearing structure including two thrust plates similar to the bearing of the spindle motor constructed according to the present invention, and as illustrated in FIG. 11 and disclosed in the official gazette in Japanese Patent Laid-Open Publication No. 3-157513, and the specification of British Patent Laid-Open Application No. 2231372A has been developed. FIG. 11 is a schematic sectional view of the H-type bearing structure, particularly showing that thrust plates 33 and 33' are fixedly secured to a radial bearing member 34. Also with respect to the H-type bearing structure constructed in the above-described manner, it is necessary to properly control a clearance in the same manner as the conventional radial bearing in order to raise reliability on the properties of he bearing structure up to an order equivalent to the conventional ball bearing.

FIG. 12 is a diagram which illustrates the relationship of rigidity of a bearing relative to a ratio of a clearance $(a+a')$ of each of three kinds of pneumatic dynamic pressure thrust bearings usable for three kinds of spindle motors for HDD to a diameter A of a sliding portion, wherein a characteristic curve (1) represents the case that a thrust bearing for a spindle motor has a diameter of 5.25", a characteristic curve (2) represents the case that it has a diameter of 3.5" and a characteristic curve (3) represents the case that it has a diameter of 2.5". In the drawing, the bearing rigidity is represented by way of ratio, while ⅓ of the rigidity of a bearing generally used for the foregoing three kinds of spindle motors is taken as a reference value 1. It should be noted that calculations were conducted based on a rotational speed of 3,600 rpm, the speed generally employed for spindle motors at present, for preparing the aforementioned characteristic curves for the dynamic pressure thrust bearings.

As is apparent from FIG. 12, to assure that each thrust bearing exhibits a bearing rigidity as low as about ⅓ or more of the rigidity of the conventional ball bearing at a comparatively low rotational speed of 3,600 rpm, it is necessary that an inequality of $(a+a')/A < 2.5/10^4$ is substantially established for representing a clearance of each of the three kinds of thrust bearings each having a different size. This means that in the case of the characteristic curve (3) shown in FIG. 12, it is necessary that each thrust bearing has a clearance as represented by an inequality of $(a+a') < 0.00425$ mm, i.e., 4.25 μm.

On the other hand, with respect to the H-type bearing structure as shown in FIG. 11, it is necessary to threadably tighten a nut 40 in order to assure that the thrust plates 33 and 33' are fixedly secured to the opposite ends of the radial bearing member 34 which in turn is fixedly secured to a stationary shaft 32. However, since there is a possibility that the thrust plate 33' is deformed due to a large magnitude of tightening torque, resulting in the bearing clearance being reduced in excess of an expected thrust clearance, it is important to properly control the torque to be imparted to the spindle motor.

FIGS. 13(a and b) are diagrams which illustrate that the clearance of the thrust bearing is reduced as the tightening torque, provided by threadably tightening the nut 40 for the bearing unit on the stationary side (comprising thrust plates 33 and 33' and a radial bearing member 34) having the properties represented by the characteristic curve (3) shown in FIG. 12, increases. When the bearing unit is tightened with a standard magnitude of tightening torque specified for the nut 40, it is deformed in terms of a clearance by a maximum quantity of 5 μm. For this reason, even though the respective components constituting the thrust bearing are previously machined so as to allow the clearance to be set to 4.25 μm or less, the clearance is reduced to a level of zero when the nut 40 is threadably tightened. In case that some of the components are molded of a ceramic material that is a brittle material, when the nut 40 is threadably tightened with the foregoing magnitude of torque, there sometimes arises a malfunction in that a crack occurs with a part of the thrust plate 33 immovably placed on the stepped part of the stationary shaft 32.

Even though individual dimensions of the thrust bearing are determined in previous consideration of the quantity of deformation caused by threadably tightening the nut 40, the thrust plate 33' is deformed as illustrated in FIG. 14, resulting in the expected properties of the thrust bearing failing to be obtained. For this reason, it is necessary that the tightening torque generated by threadably tightening the nut 40 is reduced to a level of several fractions of the standard value (i.e., a torque corresponding to the state that the tensile stress appears at 70% of a yielding point attributable to an axial force caused by the tightening torque received by a bolt). In addition, it is necessary that the thrust plate 33 is fixedly secured to the radial bearing member 34.

The bearing unit on the stationary side (thrust plates 33 and 33' and radial bearing member 34, each of which is a member to be tightened) is made using a ceramic material having a low linear (thermal) expansion coefficient, while the stationary shaft 32, i.e. a tightening member, is made of stainless steel having a high linear expansion coefficient. In practice, each thrust bearing is stored within the wide temperature range of −40° C. to 70° C. For example, when it is assumed that the thrust bearing is assembled at a temperature of 20° C., the working temperature varies within the maximum differential temperature of 60° C. Thus, when the thrust bearing is used at a lower working temperature, the bearing unit is tightened with a larger magnitude of tightening force while a fiat washer is interposed between the nut 40 and the upper thrust plate 33'. On the contrary, when it is used at a higher working temperature, there sometimes arises a malfunction in that the tightened state is loosened. Conclusively, any method of assuring that an adequate tightening torque can be maintained for the tightening unit regardless of the wide temperature variation as mentioned above is not available until now. It should be noted that in connection with the H-type bearing structure, a technical concept for restrictively defining a quantity of floatation of a rotating assembly between an upper thrust plate and a washer is disclosed in the official gazette in Japanese Patent Laid-Open Publication NO. 63-241517. With this prior technical concept, however, it is practically impossible to fixedly secure the thrust plate 33 to the radial bearing 34.

In case that a bearing having the foregoing H-type bearing structure is employed for a spindle motor, there is seen a general tendency that a radial bearing has less rigidity compared with a thrust bearing, because the radial bearing can not be designed to have a sufficient axial length due to dimensional restrictions. With respect to the foregoing type of radial bearing, when the spindle motor starts or stops its rotation, a rotating member is sometimes inclined relative to a bearing member on the stationary side due to various factors. Additionally, a similar phenomenon is liable to appear during rotation of the rotating assembly due to shock imparted to the spindle motor from the outside.

In addition to the foregoing fact, the thrust load induced attributable to the weight of the rotating assembly makes the durability of the thrust bearing against repeated starts and stops of the spindle motor insufficient. FIG. 4(b) is a schematic sectional view of a spindle motor, particularly showing a load exerted on a thrust bearing during rotation of the spindle motor in the thrusting direction as well as the structure of a bearing portion. In case that a rotating assembly of the spindle motor rotates at a rated rotational speed with the shown attitude, when it is assumed that the weight of the rotating assembly is designated by W, reactive forces $F_U$ and $F_L$ generated by upper and lower thrust bearing portions balance each other, as represented by the following equation.

$$F_L = F_U + W$$

In the foregoing balanced state, clearances at upper and lower thrust bearing portions are designated by reference characters a and a'.

For example, when the spindle motor starts to stop its rotation, its rotational speed is gradually reduced. Although the reactive forces $F_U$ and $F_L$ generated by the dynamic pressure bearing portions decrease as the rotational speed of the spindle motor is reduced, the weight W of the rotating assembly is kept unchanged irrespective of the rotational speed of the spindle motor. Therefore, while the spindle motor rotates at a reduced rotational speed $N_0$, and thereby the following inequality is established, the lower thrust plate is brought in contact with the radial sleeve.

$$F_L < F_U + W$$

Thus, the radial sleeve slidably moves in the circumferential direction while coming in contact with the lower thrust plate for a period of time from the time when the spindle motor rotates at the rotational speed $N_0$ rpm until the time when it stops its rotation. Consequently, the energy generated by the rotating assembly at the rotational speed $N_0$ is absorbed by the lower thrust plate as the lower slide portion of the thrust bearing frictionally wears. On completion of the absorption of the foregoing energy, the spindle motor is caused to stop its rotation. A single disc or a plurality of discs each having a diameter considerably larger than an outer diameter of the hub of the spindle motor are placed around the outer periphery of the hub. Thus, the inertia moment generated by the discs is larger by 100 to 1000 times compared with that generated by the hub, and moreover, it is kept unchanged regardless of application field of of spindle motor.

When it is assumed that the inertia moment generated by the rotating assembly of the spindle motor inclusive of that of the discs, is designated by I. The rotational energy E to be absorbed by the thrust bearing is represented by the following equation.

$$E = (\tfrac{1}{2})\{I(2\pi N_0/60)^2\}$$

Due to the fact that a value of he rotational energy E generated by the conventional spindle motor is excessively large, resulting in the thrust bearing being damaged as the spindle motor repeats starts and stops of rotation thereof, the sliding surface of the thrust bearing becomes coarse. This finally this leads to the result that the spindle motor can not restart its rotation. Generally, it is specified that each spindle motor should be able to repeatedly start and stop its rotation several hundred thousand times, but the conventional spindle motor constructed in the above-described manner can not satisfy the foregoing specification. This is because the conventional spindle motor is not provided with means for setting the rotational speed $N_0$ to a low level, i.e., means for reducing the weight W of the rotating assembly of the spindle motor, resulting in the conventional spindle motor failing to exhibit excellent durability against repeated starts and stops of the rotation thereof.

SUMMARY OF THE INVENTION

The present invention has been made in consideration of the aforementioned background, and its object resides in providing a spindle motor including an improved H-type bearing structure which assures that it hardly vibrates during rotation, satisfactorily stands against shock imparted thereto from the outside, and moreover, exhibits excellent durability against repeated starts and stops of the rotation thereof without any appearance of the problems inherent to of conventional spindle motor as mentioned above.

Means for Solving the Problems

To accomplish the above object, the present invention provides a spindle motor including as essential components, a cylindrical radial bearing member of which at least sliding portions are made of a ceramic material, two thrust plates which are brought in direct contact with the opposite end surfaces of the radial bearing member and of which at least sliding portions are made of a ceramic material, the thrust plates being integrated with the radial bearing member to serve as a stationary side member, and a cylindrical radial sleeve of which an inner circumferential surface and opposite end surfaces are rotatably supported by the outer circumferential surface and opposite end surfaces are rotatably supported by the outer circumferential surface of the radial bearing member. The surfaces of the thrust plates are located opposite to those of the radial sleeve and at least sliding portions thereof are made of a ceramic material so that a radial pneumatic dynamic pressure bearing and a thrust pneumatic dynamic pressure bearing are constructed by the radial bearing member, the thrust plates and the radial sleeve. The stationary side member is fixedly secured to a stationary shaft by tightening a fixing member disposed on the stationary shaft, which extends through through holes formed through the stationary side member. A cap-shaped rotating member is integrally assembled around the outer circumferential surface of the radial sleeve, and a rotor magnet is fixedly secured to the rotary member in such a manner as to assume a position located opposite to a stator core in a motor section. A plurality of dynamic pressure generating grooves are formed on the opposite end surfaces of the radial sleeve on the rotary side of the thrust pneumatic dynamic pressure bearing, or on the surfaces of the thrust plates on the stationary side of the same, wherein the spindle motor is characterized in that a total thrust clearance $a+a'$ between the opposite end surfaces of the radial sleeve and the surfaces of the thrust plates located opposite to the former is represented by the following inequality, based on a sliding surface diameter A of each of the thrust plates.

$$(a+a')/A < 2.5/10^4$$

Another characterizing feature of the spindle motor according to the present invention lies in a total clearance between the outer circumferential surface of the radial bearing member and the inner circumferential surface of the radial sleeve being represented by the following inequality based on an outer diameter B of the sliding surface of the cylindrical radial bearing member:

$$(b+b')/B < 5/10^4.$$

Another characterizing feature of the spindle motor constructed according to the present invention lies in a ratio of the total thrust clearance $a+a'$ between the opposite end surfaces of the radial sleeve and the surfaces of the thrust plates, located opposite to the former, to the diameter A of the sliding surface of each of the thrust plates, and a ratio of the total clearance $(b+b')$ between the outer circumferential surface of the radial sleeve and the inner circumferential surface of the radial sleeve, to a length L of the radial sleeve as measured in the axial direction being represented by the following inequality:

$$(a+a')/A < (b+b')/L$$

Another characterizing feature of the spindle motor constructed according to the present invention is that, in case the members on the stationary side are fixedly secured to the stationary shaft by tightening the fixing member, a member such as a spring washer or the like, of which deformation induced by a tightening force is larger than that of a flat washer, and which has little plastic deformation, is interposed between the fixing member and one of the thrust plates.

In addition, another characterizing feature of the spindle motor constructed according to the present invention lies in the motor section being designed as a radial gap type that includes means for generating a force effective in the opposite direction to the thrust load by a magnetic force corresponding to the attitude for mounting the spindle motor. The foregoing force is approximately equal to the thrust load induced attributable to the weight of the rotating member or the like.

Further, another characterizing feature of the spindle motor constructed according to the present invention lies in the means for generating a force effective in the opposite direction to the thrust load by a magnetic force, the foregoing force being approximately equal to the thrust load induced by positionally offsetting the magnetic center of the stator cores in the motor section relative to the magnetic center of the rotor magnet in the axial direction.

Mode of Operation

With respect to the pneumatic dynamic force bearing usable for the spindle motor constructed according to the present invention, correct perpendicularity of the outer circumferential surface of the radial bearing member relative to the surface of one of the thrust plates located opposite to the former, while coming in direct contact with the opposite end surfaces of the radial bearing, can easily be realized by fixedly securing the thrust plates to the stationary shaft by tightening the fixing member, provided that perpendicularity of the opposite end surfaces of the radial bearing member relative to the outer circumferential surface of the same is exactly settled.

In addition, with respect to the clearance for the radial bearing, a predetermined clearance can be obtained by precisely machining the outer circumferential surface of the radial bearing member and the inner circumferential surface of the radial sleeve. Further, the clearance for the thrust bearing can easily be determined by precisely maintaining a difference between the height of the radial bearing member and the height of the radial sleeve. An excellent assembling accuracy can be obtained by assembling together components each molded of a ceramic material at a high working accuracy without ny combination with another component while bringing them in direct contact with each other to build an integral structure. Even in case the rotating member is inclined relative to the bearing on the stationary side, a spindle motor having excellent durability and reliability can be provided by bringing the rotating member in contact with the thrust bearing rather than the radial bearing having poor rigidity while taking account of the clearance associated with the thrust bearing.

When a force having the substantially the same magnitude as that of the thrust load imparted to the spindle motor attributable to the weight of the rotating member while acting in the opposite direction to the thrust load is generated by magnetic force, the apparent thrust load acting on the spindle motor can be reduced to a substantially zero level. In addition, when each sliding portion is molded of a ceramic material, such as silicon carbide, alumina or the like, each having excellent durability and excellent sliding properties, it becomes possible to minimize torque los of the thrust bearing portion at the time of starting rotation of the spindle motor. Consequently, the spindle motor constructed according to the present invention exhibits substantially improved durability against repeated starts and stops of the rotation thereof as compared with the conventional spindle motor. The fact that "each sliding portion is made of a ceramic material" herein referred to herein, represents the case where only the sliding surface layer of each sliding portion is made of a ceramic material by employing a coating process or the like, in addition to the case where the whole sliding portion is made of a ceramic material. In addition, since the radial sleeve is located opposite to the two thrust plates and the radial bearing member with a small clearance kept therebetween during rotation of the spindle motor, it is uniformly thrusted by a sufficiently high intensity of dynamic pressure not only in the thrusting direction but also in the radial direction. Thus, the spindle motor has a sufficiently high rigidity to resist any exterior force or the like.

Further, when a spring washer or a similar member is interposed between the fixing nut and the thrust plate, it is largely deformed by tightening the fixing nut much more than an ordinary flat washer. Thus, a substantially constant tightening force can be maintained with the spring washer within a wide temperature range even when the fixing nut is tightened with a low magnitude of torque such that the thrust clearance is not affected, whereby excellent bearing properties can be maintained within the wide temperature range. Since the spring washer is largely deformed with a tightening torque as low as several fractions of a standard value of tightening torque, the thrust plates can be fixedly secured to the radial bearing member with a high intensity force. In other words, the spring washer is tightened within the wide working temperature range with a sufficiently high intensity force to allow the thrust plates to be fixedly secured to the radial bearing member while both the upper and lower surfaces of the spring washer are not brought in close contact with the fixing nut and the thrust plates over their whole surface, and the resiliency of the spring washer is still maintained.

BRIEF DESCRIPTION OF THE DRAWINGS

FIGS. 6(a) to (d) show results derived from measurements conducted for determining the perpendicularity of an outer circumferential surface of the radial bearing member relative to an upper surface of a thrust bearing plate after the spindle motor is assembled.

DETAILED DESCRIPTION OF THE PREFERRED EMBODIMENTS

The present invention will now be described in detail hereinafter with reference to the accompanying drawings which illustrate a preferred embodiment thereof.

Figure 1:
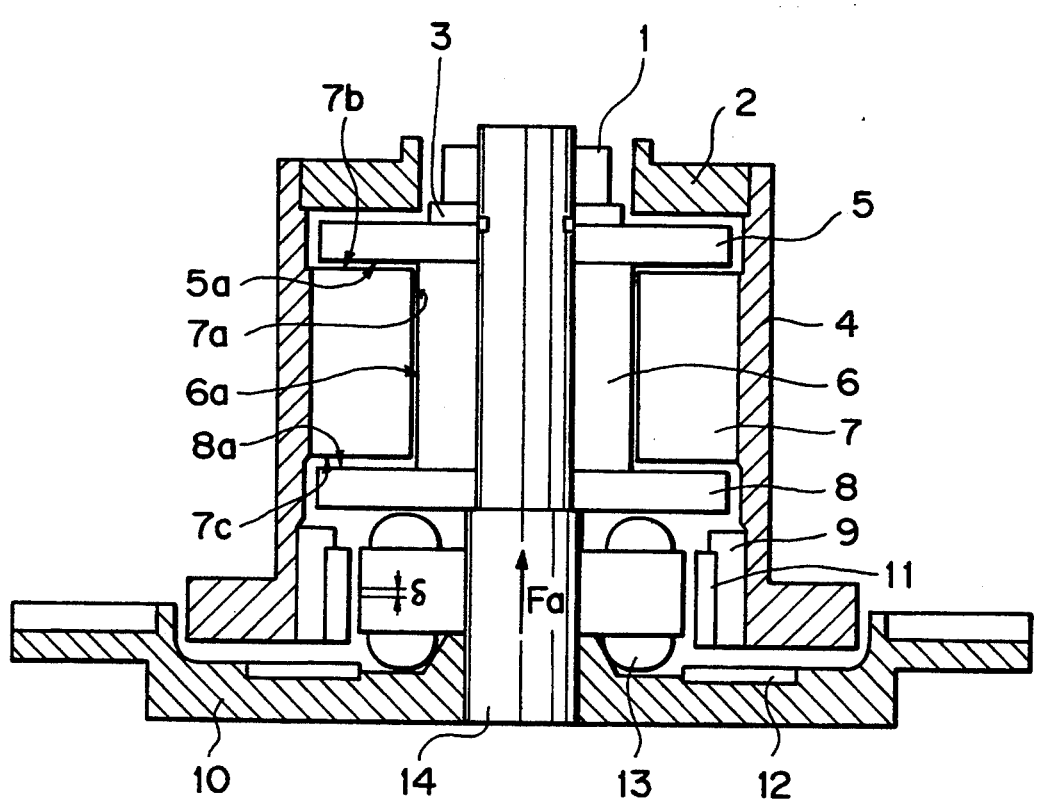
FIG. 1 is a sectional view of a spindle motor constructed according to an embodiment of the present invention.

FIG. 1 is a sectional view of a spindle motor constructed according to an embodiment of the present invention. In the drawing, reference numeral 6 designates a cylindrical radial bearing member. Two thrust plates 5 and 8 are brought in direct contact with the opposite end surfaces of the radial bearing member 6. Reference numeral 7 designates a cylindrical radial sleeve. An inner circumferential surface 7a and opposite end surfaces 7b and 7c of the radial sleeve 7 are rotatably supported by an outer circumferential surface 6a of the radial bearing member 6 and surfaces 5a and 8a of the same facing the end surfaces 7b and 7c of the radial sleeve 7. The outer circumferential surface 6a of the radial bearing member 6 constitutes a pneumatic radial dynamic pressure bearing in cooperation with the inner circumferential surface 7a of the radial sleeve 7, and the surfaces 5a and 8a of the thrust plates 5 and 8 constitute pneumatic thrust dynamic pressure bearings in cooperation with the opposite surfaces 7b and 7c of the radial sleeve 7.

A stationary shaft 14 standing upright on the central part of a mounting board 10 is caused to extend past a through hole formed through the central part of the bearing member on the stationary side and is integrally constructed by bringing the thrust plates 5 and 8 in direct to contact with the opposite end surfaces of the bearing member 6, Subsequently the radial bearing member 6 and the thrust plates 5 and 8 are fixedly secured to the stationary shaft 14 by threadably tightening a fixing nut 1 located at the upper end of the stationary shaft 14. It should be noted that a spring washer 3 is interposed between the fixing nut 1 and the thrust plate 5.

A stator core 13 (inclusive of a stator coil that consists of a multiplicity of coils) is at ranged in an equally spaced relationship around the outer circumferential surface of the stationary shaft 14 at the lower part thereof. On the other hand, a cap-shaped hub 4 for holding an information recording medium such as a magnetic disc or the like thereon is assembled and integrated with the radial sleeve 7 around the outer circumferential surface of the same, and a rotor magnet 11 consisting of a multiplicity of radial magnets is fixedly secured by a back yoke 9 around the inner circumferential surface of the hub 4 around the lower part of the same and is located opposite to the stator core 13. In FIG. 1, reference numeral 12 designates a Hall element base board on which Hall elements (not shown) are installed for the purpose of detecting the position of the rotor magnets 11. It should be noted that the magnetic center of the stator core 13 is positionally offset from the magnetic center of the rotor magnet 11 in the axial direction by a quantity of δ in order to generate a force substantially equal to a thrust load and effective in the opposite direction relative to the thrust load.

Figure 2:
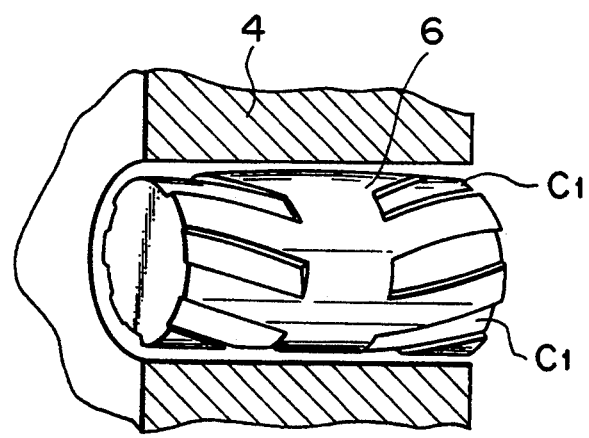
FIG. 2 is an exploded fragmentary perspective view of the spindle motor of FIG. 1, particularly showing by way of example a plurality of dynamic pressure generating grooves formed on a sliding surface of a radial bearing member.
Figure 3:
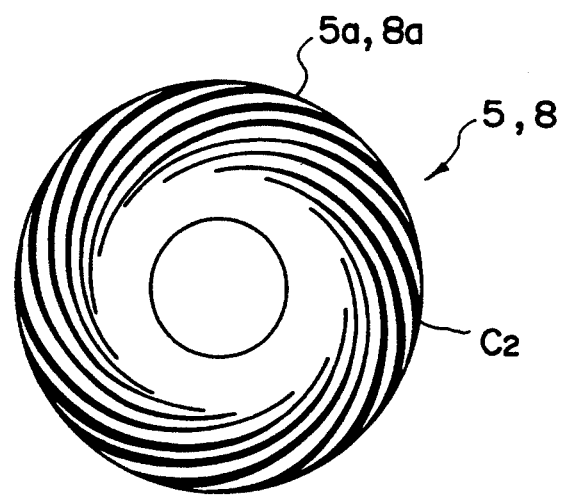
FIG. 3 is an illustrative view which shows by way of example a plurality of dynamic pressure generating grooves formed on the sliding surface of a thrust plate.

For example, a plurality of spirally extending dynamic pressure generating grooves C2 as shown in FIG. 3 are formed on each of the surfaces 5a and 8a of the thrust plates 5 and 8 located on the stationary side of the pneumatic thrust dynamic pressure bearing, while each of the opposite end surfaces 7b and 7a of the radial sleeve 7 located on the rotary side of the same is machined to a flat plane. In addition, for example, a plurality of herringbone-shaped dynamic pressure generating grooves C1 as shown in FIG. 2 are formed at the opposite end parts of the outer circumferential surface 6a of the radial bearing member 6 located on the stationary side of the pneumatic radial dynamic pressure bearing, while the inner circumferential surface 7a of the radial sleeve 7, located on the rotary side of the same, is likewise machined to a flat plane. Incidentally, formation of the dynamic pressure generating grooves for the pneumatic dynamic pressure bearing as mentioned above should not be limited only to the stationary side. Alternatively, it is acceptable that a plurality of spirally extending dynamic pressure generating grooves are formed on the opposite end surfaces 7b and 7c of the radial sleeve 7 located on the rotary side, a plurality of herringbone-shaped dynamic pressure generating grooves are formed around the inner circumferential surface 7a of the same, each of the opposite end surfaces 5a and 8a of the thrust plates 5 and 8 located the stationary side is machined to a flat plane, and moreover, the outer circumferential surface 6a of the radial bearing member 6 located on the stationary side of the same is machined to a flat plane.

Figure 14:
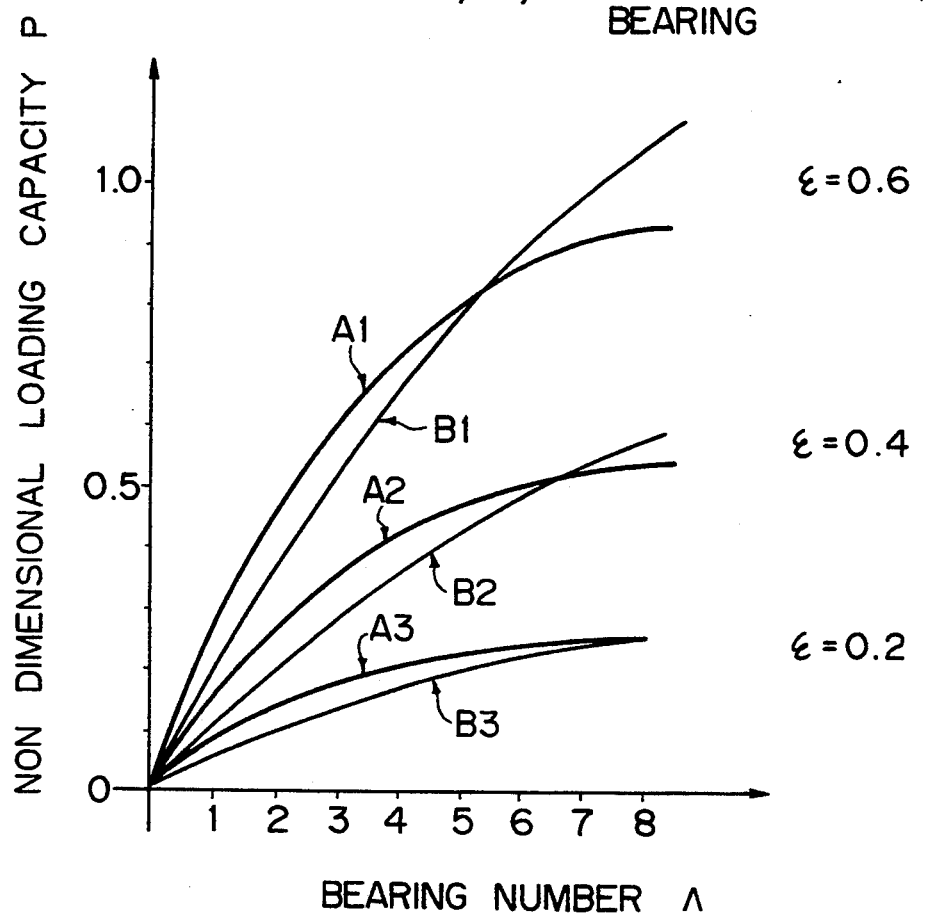
FIG. 14 shows characteristic curves of a comparison between the loading capacity of a cylindrical bearing having no radial dynamic pressure radiating groove formed thereon and the loading capacity of a herringbone type bearing having a plurality of herringbone-shaped dynamic pressure generating grooves.
Figure 15:
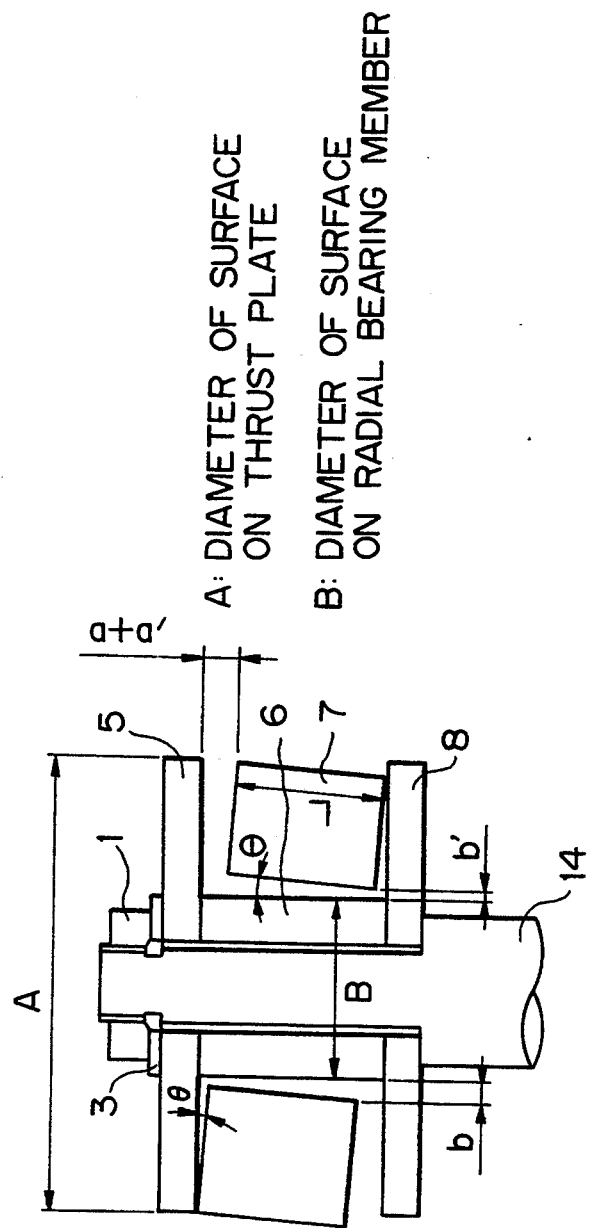
FIG. 15 is a schematic sectional view of an H-type dynamic pressure bearing, particularly showing the case that a rotating assembly inclusive of a radial sleeve is inclined relative to members located on the stationary side.

It is not required that a plurality of radial dynamic pressure generating grooves are formed on the dynamic pressure bearing for a spindle motor for HDD. Specifically, since the spindle motor for HDD usually rotates at a rotational speed ranging from 3,600 rpm to 8,000 rpm, any significant difference is not recognized in respect of rigidity between a true circle type bearing having no radially extending dynamic pressure generating groove formed thereon and a dynamic pressure bearing having a plurality of dynamic pressure generating grooves formed thereon. FIG. 14 is a diagram which illustrates characteristic curves for a cylindrical bearing having a plurality of radially extending dynamic pressure generating grooves as well as characteristic curves for a herringbone type bearing having a plurality of herringbone-shaped dynamic pressure generating grooves. In the drawing, the ordinate represents a non dimensional loading capacity at the fixed eccentricity and the abscissa represents the bearing number A. The non dimensional loading capacity P is represented by the following equation.

$P = W/(LDPa)$ where W designates a load to be supportable given by a rotating assembly in the spindle motor, L designates the length of each radial bearing a measured in the axial direction, D designates the diameter of each radial bearing, and Pa designates air pressure as measured at an inlet of each radially extending dynamic pressure generating groove. Bearing number A is a dimensionless number expressing a characteristic of the bearing and is represented by the following equation.

$\lambda = (6\eta\omega/Pa)(R/Cr)^2$ where η designates the viscosity of a lubricant fluid (air in this embodiment), ω designates the rotational angular speed of each bearing, Pa designates an air pressure as measured at inlet of each radially extending dynamic pressure generating groove, R designates a radius of the radial bearing, and Cr designates the clearance as measured in the radial direction of the radial bearing.

In FIG. 14, characteristic curves A1, A2 and A3 show a cylindrical bearing having no radially extending dynamic pressure generating groove, and characteristic curves B1, B2 and B3 show a herringbone bearing having a plurality of herringbone-shaped dynamic pressure generating grooves. The letter "ε" represents a dimensionless eccentricity of the bearing and is the quotient of dividing an offset between centers of inner and outer sliding surfaces of the bearing by a radial mean clearance between the sliding surfaces of the bearing. A large ε means a sate of a bearing which supports a large load. As is apparent from the drawing, as long as the bearing number is 5 or less, the cylindrical bearing without grooves exhibits a larger loading capacity, i.e., a larger shaft rigidity, than the herringbone type bearing.

With the spindle motor constructed in the above-described manner, provided that the flatness of each of the thrust plates 5 and 8 and the perpendicularity of the opposite end surfaces of the radial bearing member 6 relative to the outer circumferential surface of the same are correctly settled, correct perpendicularity of the outer circumferential surface 6a of the radial bearing 6, constituting a pneumatic dynamic pressure bearing in cooperation with the radial sleeve 7, relative to the surfaces 5a and 8a of the thrust plates 5 and 8 can easily be realized at the time of assembly, achieved being by threadably tightening the fixing nut 1.

FIG. 6 shows results derived from measurements conducted for determining the perpendicularity of the upper surface of the thrust bearing plate 8 relative to the outer circumferential surface of the radial bearing member 6 after completion of an assembling operation, wherein FIG. 6(a) is a schematic sectional view which shows an assembly consisting of a mounting board 10, a stationary shaft 14, upper and lower thrust plates 5 and 8 and a radial bearing member 6, FIG. 6(b) is a schematic plan view of the radial bearing member 6 as seen in the Q arrow-marked direction in FIG. 6(a), FIG. 6(c) shows surface roughness of an upper surface J of the lower thrust plate 8, surface roughness of a lower surface M of the upper thrust plate 5 and the degrees of parallel of the upper thrust plate 5 relative to the lower thrust plate 8, and FIG. 6(d) shows the perpendicularity of an outer circumferential surface K of the radial bearing member 6 relative to the surface J of the lower thrust plate 8. In FIG. 6(c), a plurality of saw-tooth shaped projections illustrate the presence of a plurality of dynamic pressure generating grooves, and FIG. 6(d) shows the case where a cylindrical bearing having no saw-tooth shaped projections formed thereon is used for the spindle motor. As is apparent from these drawings, the outer circumferential surface K of the radial bearing member 6 axially extends within the range of deviation of 1 μm from true perpendicularity.

Since the foregoing value of deviation is small, i.e., ¼ or less of a target clearance as measured not only in the radial direction bu also in the thrusting direction, a predetermined clearance can be obtained by precisely machining the outer circumferential surface of the radial bearing member 6 and the inner circumferential surface of the radial sleeve 7. The clearance for the thrust bearing can easily be obtained by correctly maintaining the difference between the height of the radial bearing member 6 and the height f the radial sleeve 7, wherein the height difference is represented by the following inequalities.

$$(a+a')/A < 2.5/10^4$$

$$(b+b')/A < 5/10^4$$

This is because an excellent assembling accuracy can be obtained by assembling together components each molded of a ceramic material that is easily workable with a high working accuracy to build an integral structure. Consequently, a bearing structure having a small clearance uniformly maintained around the thrust bearing can be realized.

Figure 5B:
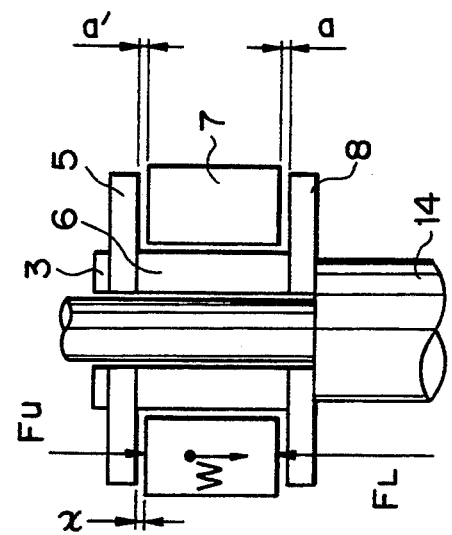
FIGS. 5(a) and (b) show other characteristic curves of the relationship between the position of the radial sleeve and the dynamic pressure applied to the radial sleeve in the thrusting direction when the spindle motor is rotationally driven.
Figure 5A:
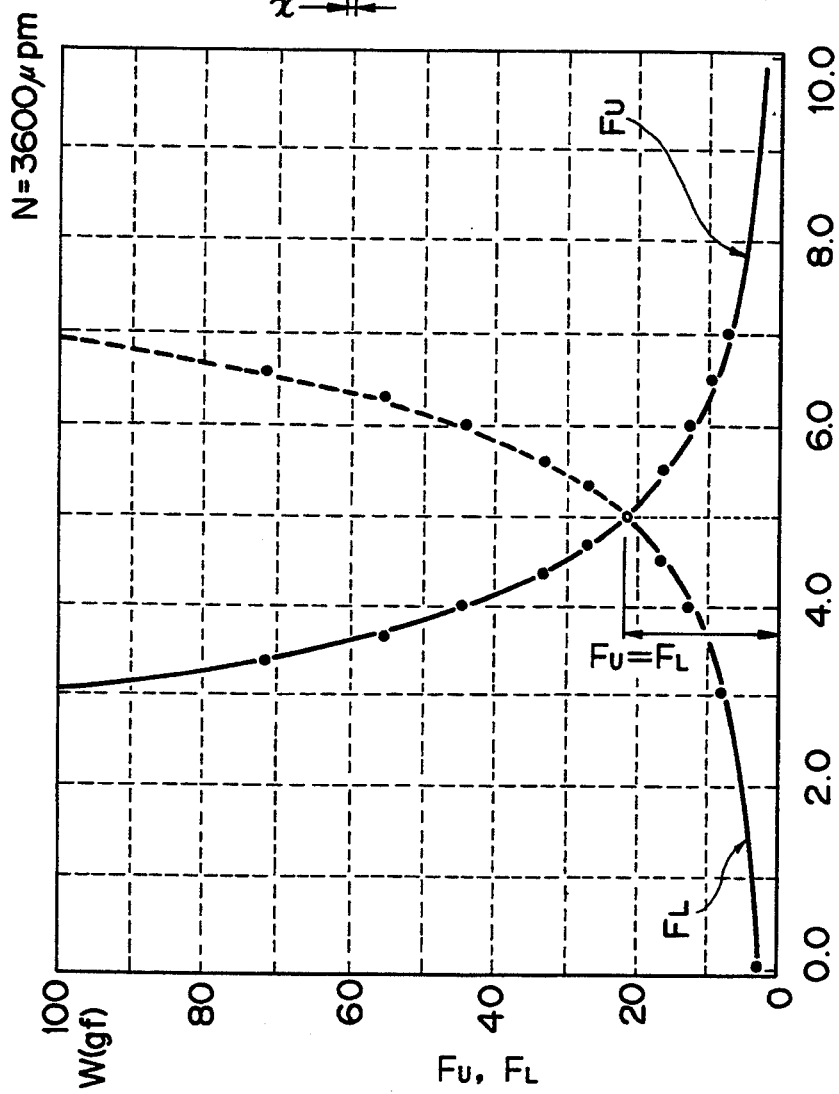
Figure 7:
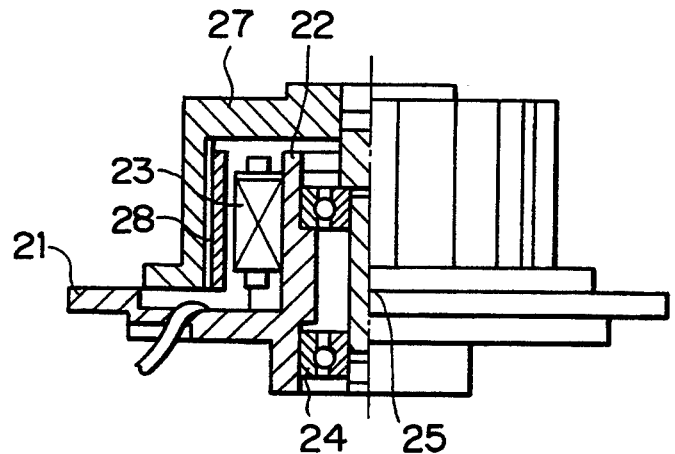
FIG. 7 is a fragmentary sectional view of a conventional spindle motor for which ball bearings are used.
Figure 8:
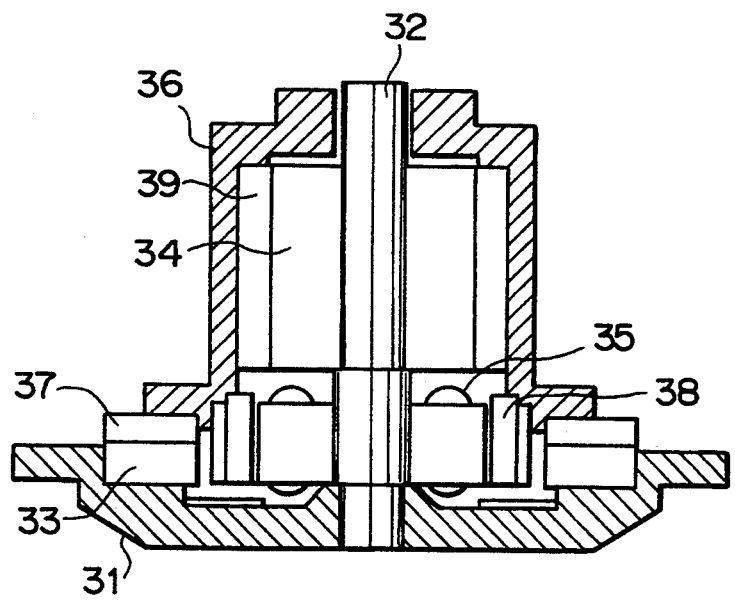
FIG. 8 is a sectional view of another conventional spindle motor for which dynamic pressure bearings are used.
Figure 9:
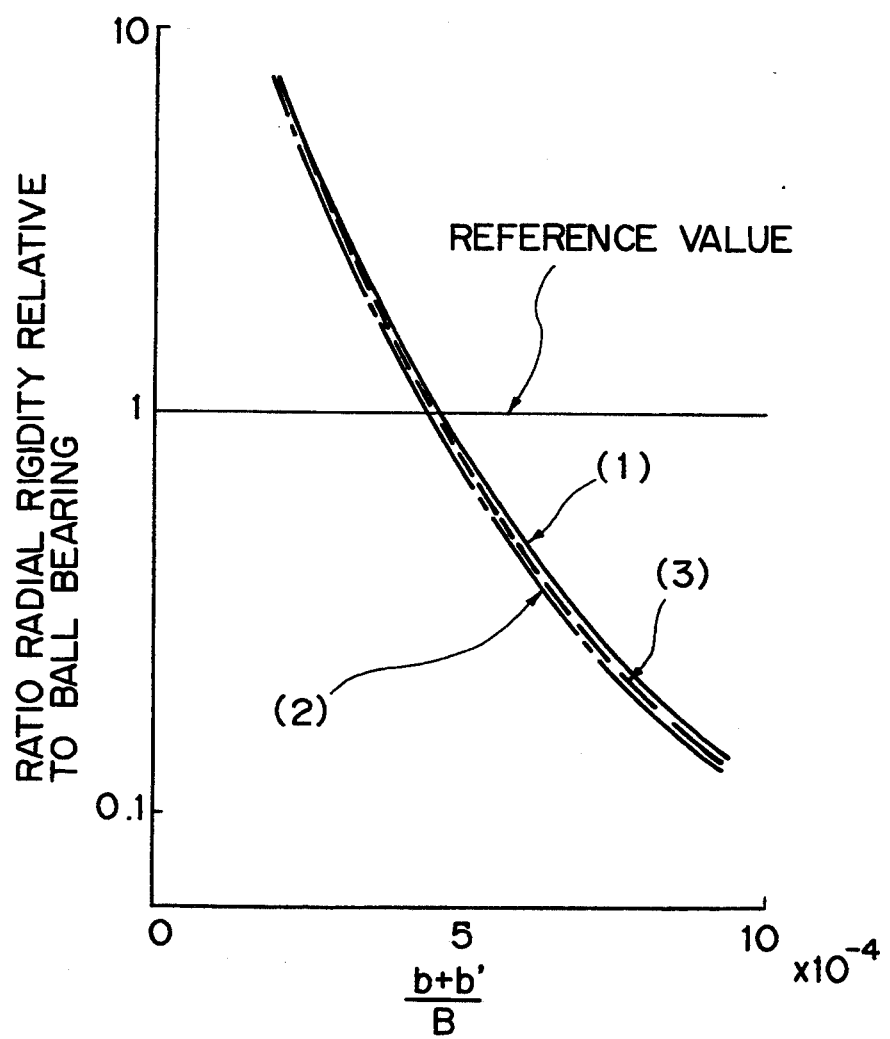
FIG. 9 shows characteristic diagrams of the relationship of the rigidity of a bearing relative to the ratio of a radial clearance of a pneumatic dynamic pressure bearing for the spindle motor to a diameter of a sliding portion.
Figure 10:
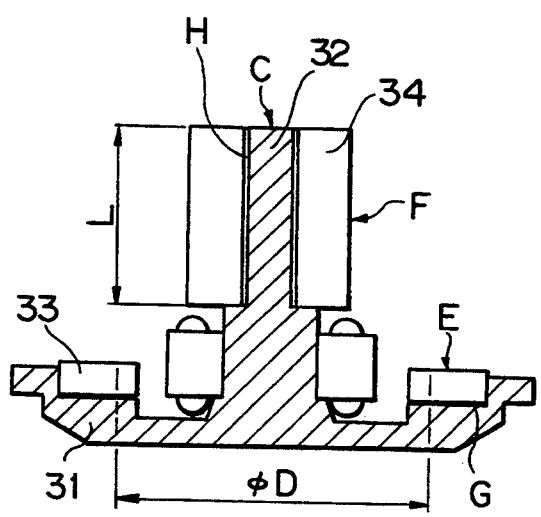
FIGS. 10(a) to (f) show results derived from measurements conducted for determining the perpendicularity of an outer circumferential surface of a radial bearing member relative to an upper surface of the thrust plate after the conventional spindle motor is assembled.
Figure 10:
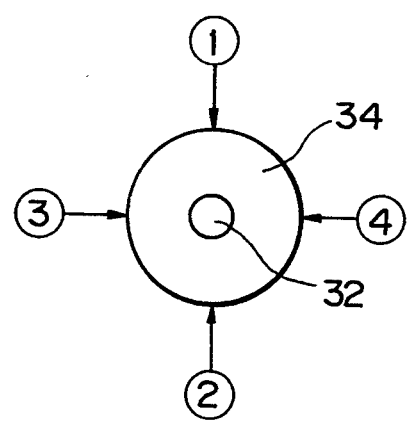
Figure 10:
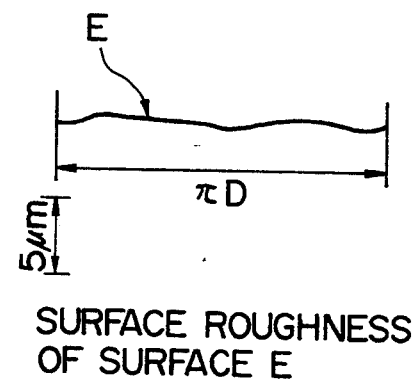
Figure 10:
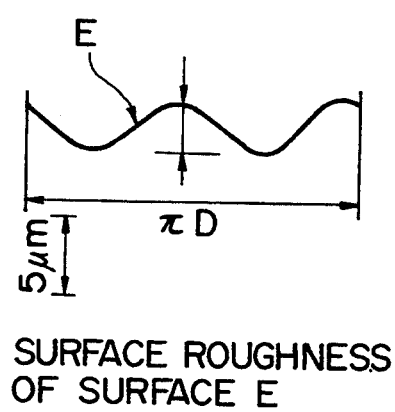
Figure 10:
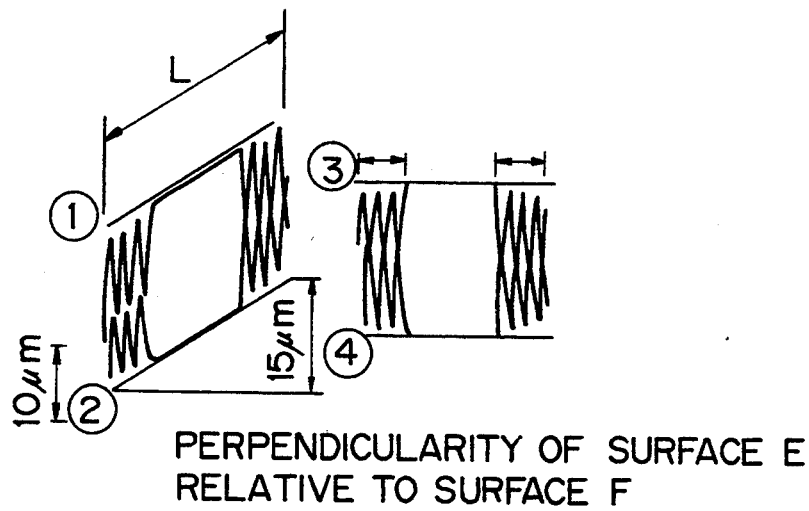
Figure 10:
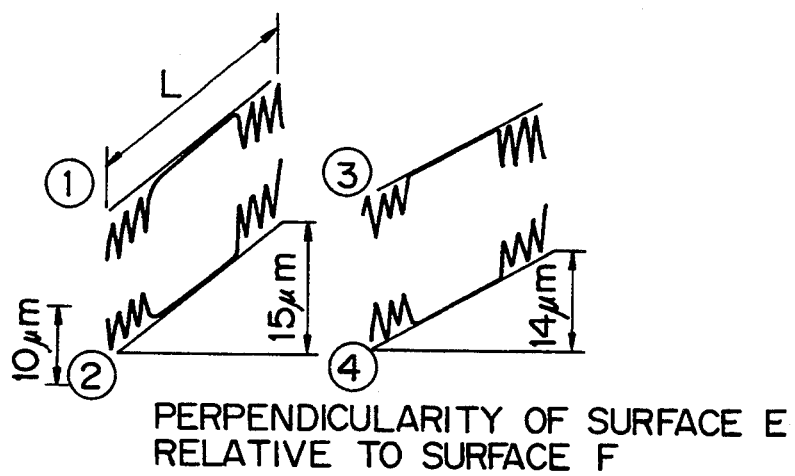
Figure 11:
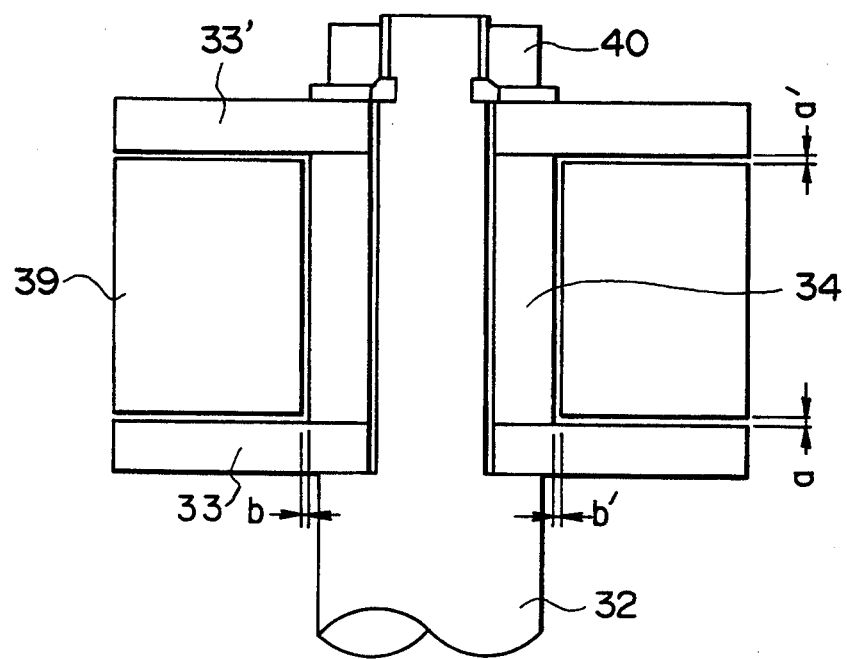
FIG. 11 is a sectional view which schematically shows the structure of a conventional H-type dynamic pressure bearing.
Figure 12:
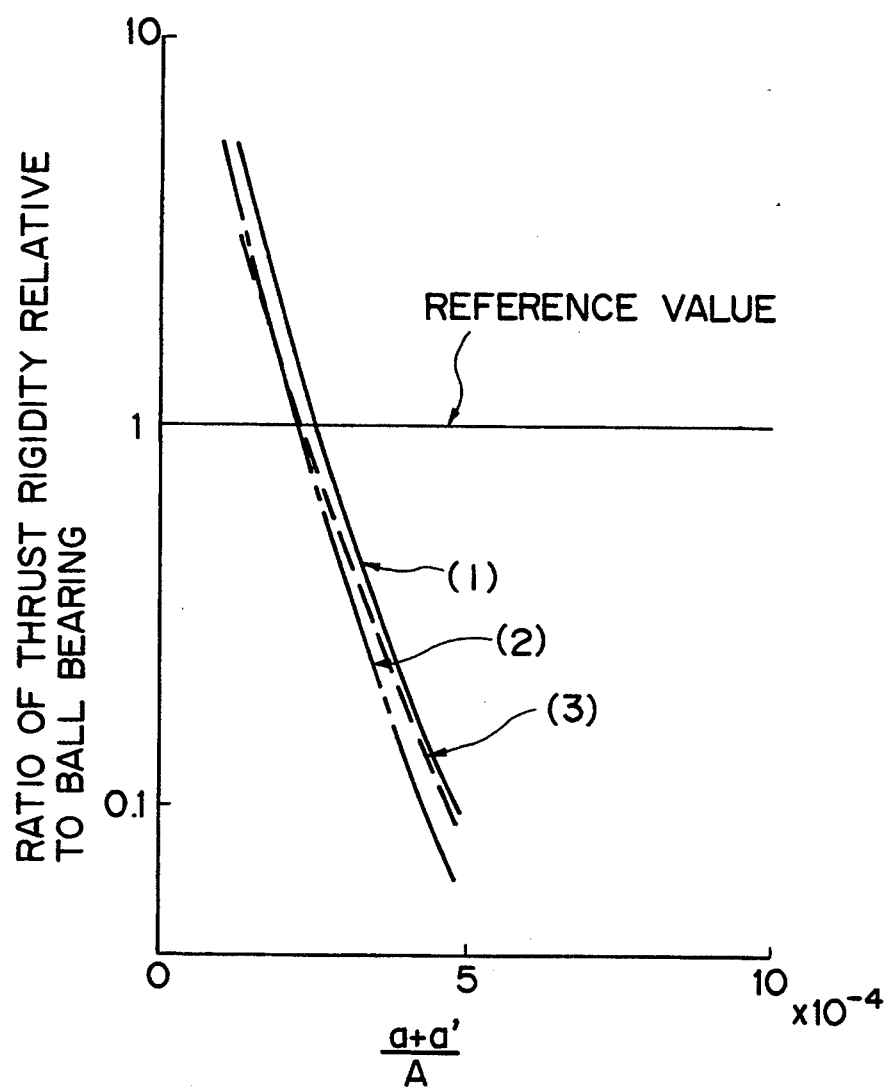
FIG. 12 shows characteristic curves of the relationship of the rigidity of a bearing relative to a ratio of a thrust clearance of a pneumatic dynamic pressure bearing for the spindle motor to a diameter of a sliding surface.
Figures 13A, 13B:
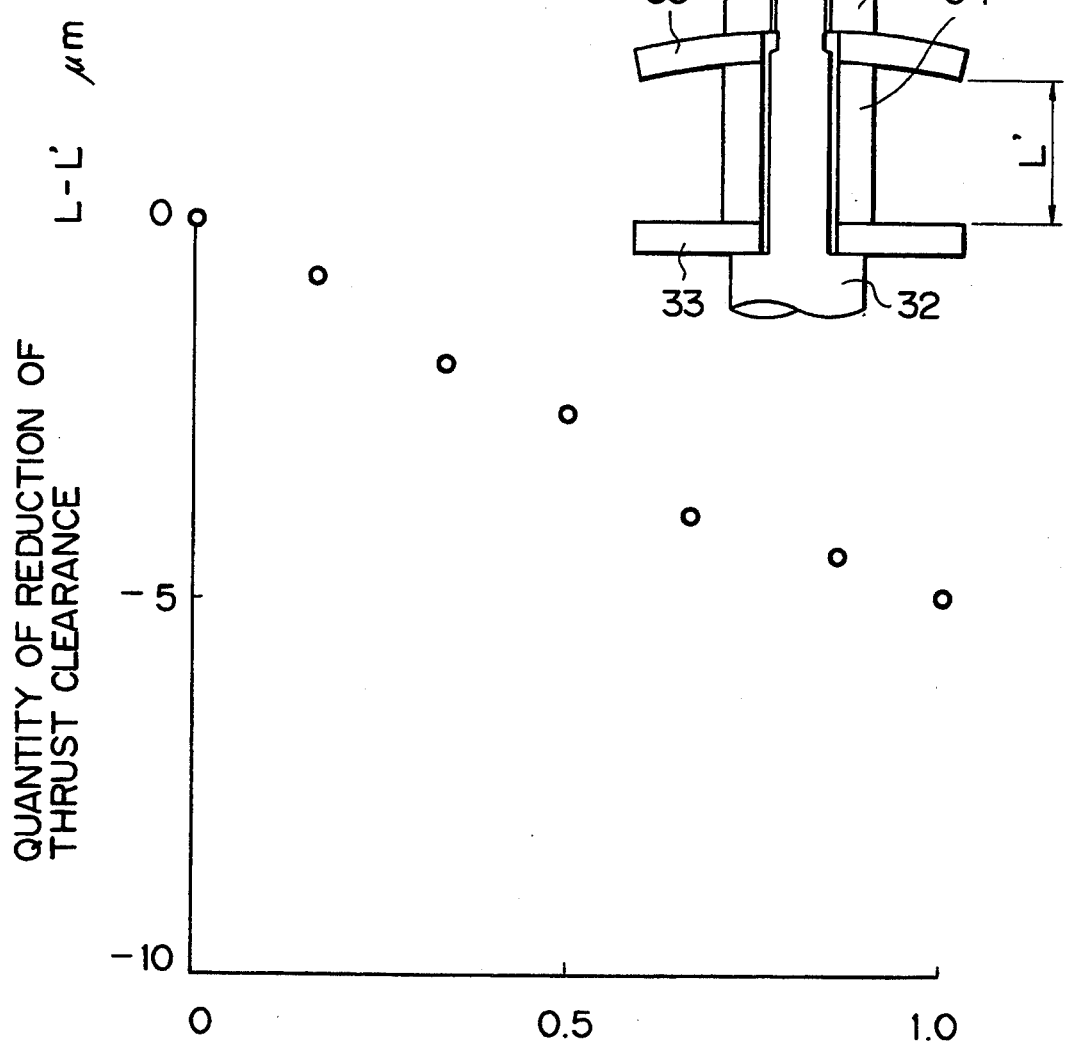
FIG. 13 shows the state in which a thrust clearance varies depending on the tightening torque generated by threadably tightening a fixing nut.

As mentioned above, in case the dynamic pressure bearing having an H-type structure constructed in the above-described manner is employed for the spindle motor, a sufficiently long length as measured in the axial direction of the radial bearing cannot be obtained due to dimensional restrictive conditions. For this reason, the rigidity for the radial bearing is generally as poor compared with rigidity of the thrust bearing. The rotating assembly in the thrust bearing is sometimes inclined relative to the members on the stationary side due to various factors at the time of start and stop of rotation of the spindle motor, and the foregoing kind of malfunction arises during rotation of the spindle motor due to shock imparted to the latter from the outside. In this embodiment, in case the rotating assembly, inclusive of the radial sleeve 7, is inclined relative to the members on tile stationary side (upper and lower thrust plate 5 and 8 and radial bearing member 6). the radial sleeve 7 is not brought into contact with the radial bearing member 6 having poor bearing rigidity but into contact with the thrust plates 5 and 8 each having excellent bearing rigidity as shown in FIG. 5. This can be realized when the following inequality is satisfactorily established.

$$(b+b')/L > (a+a')/A$$

At this time, reliability and durability of the spindle motor are improved.

In this embodiment shown in FIG. 1, since the magnetic center of the rotor magnet 11 is positionally offset from the magnetic center o the stator core 13 in the axial direction by a quantity of δ, as shown in FIG. 1, an upward force Fa is exerted on the rotor magnet 11 in the presence of a magnetic force. Specifically, since the upward force Fa is exerted on the rotating assembly in the presence of the magnetic force, the apparent weight of the rotating assembly can be reduced o a substantially zero level by properly adjusting the positional offset δ in such a manner as to allow the upward force Fa to be equalized to the total weight of the rotating assembly (consisting of a hub 4, a hub cover 2, a radial sleeve 7, a plurality of rotor magnets 11 and an information recording member (not shown)).

Once the apparent weight of the rotating assembly is reduced to the substantial zero level, the radial sleeve 7 is not brought in contact with either one of the thrust plates 5 and 8 but it is kept in the suspended state without any contact with them before the spindle motor starts its rotation. It should be added that each sliding portion in the foregoing components is molded of a ceramic material. Therefore, it is possible to minimize the torque loss appearing on the thrust bearing section when the spindle motor starts its rotation, resulting in damage received by the thrust bearing section being reduced when the spindle motor starts and stops its rotation with a small quantity of consumption of electricity. Thus, durability the of the spindle motor against repeated starts and stops can be substantially improved or compared with the conventional spindle motor.

In addition, since the radial sleeve 7 faces the upper and lower thrust plates 5 and 8 and the radial bearing member 6 with a small clearance therebetween during rotation of the spindle motor, it is uniformly thrust by the dynamic pressure not only in the thrusting direction but also in the radial direction. This means that the radial sleeve exhibits a large rigidity sufficient to stand against any exterior force or the like.

Figure 4B:
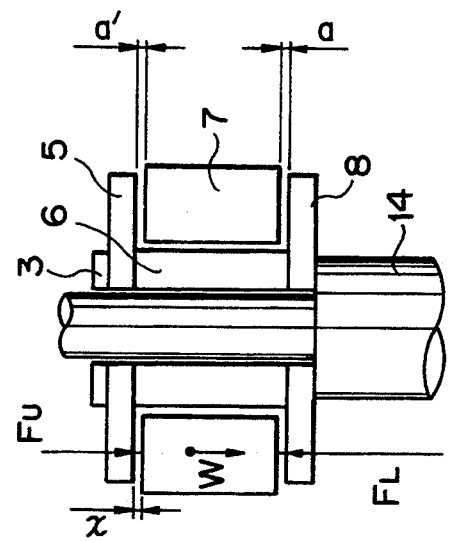
FIGS. 4(a) and (b) show characteristic curves of the relationship between the position of a radial sleeve and the dynamic pressure applied to a radial sleeve in the thrusting direction when the spindle motor is rotationally driven.
Figure 4A:
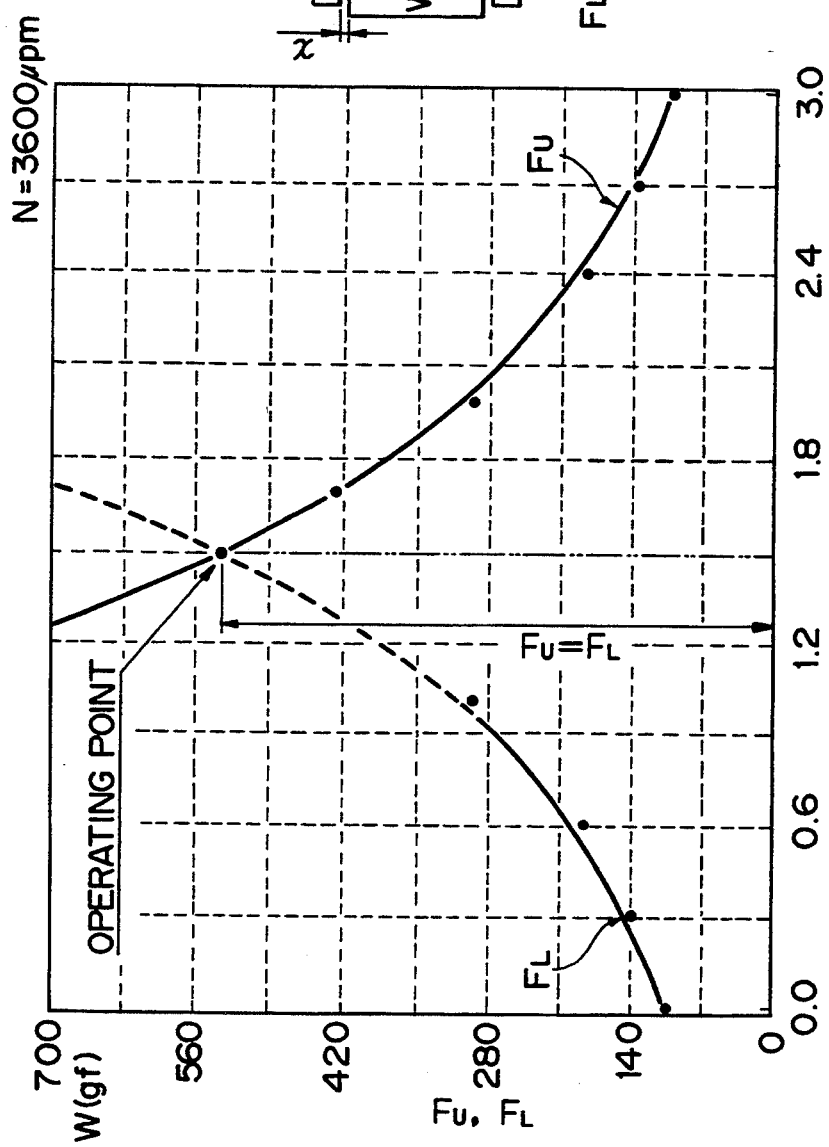

FIG. 4 illustrates the positional relationship between dynamic pressure applied to the radial sleeve 7 in the thrusting direction and the position assumed by the radial sleeve 7 when the spindle motor rotates at a rotational speed of 3,600 rpm, wherein a thrust clearance $a+a'$ represented by an equation of $(a+a')/A = 1.40/10^4$ is 3 μm Here, reference character a' designates a clearance between the lower surface of the upper thrust plate 4 and the upper end surface of the radial sleeve 7 and reference character a' designates a clearance between the upper surface of the lower thrust plate 8 and the lower end surface of the radial sleeve 7.

In FIG. 4, reference character $F_U$ designates a downward thrust force which serves to thrust the upper thrust plate 5 against the radial sleeve 7 by the generated dynamic pressure from above, reference character $F_L$ designates an upward thrust force which serves to thrust the lower thrust plate 8 against the radial sleeve 7 from below, and reference character W designates a weight of the rotating assembly. In addition, reference character x designates a distance as measured from the lower surface of the upper thrust plate 5 to the upper end surface of the radial sleeve 7. In this embodiment, the distance x is within the range as defined by an inequality of $0 < x < 3$ μm Since the weight W is adjusted to become substantially zero as mentioned above, the spindle motor is rotationally driven while the radial sleeve 7 is located at the position represented by two equations of $F_U = F_L = 540$ gf and $x = (a=a')/2$. Since both the thrust forces $F_U$ and $F_L$ are made equal to each other, as represented by the equation $F_U = F_L$, even when the rotational speed of the spindle motor varies like at the time of starting and stopping the rotation thereof, both the upper and lower thrust plates 5 and 8 and the radial sleeve 7 are little damaged when the former come in contact the latter. While the spindle motor rotates at a rated rotational speed, the upper and lower thrust plates 5 and 8 are thrust against the radial sleeve 5 with a large magnitude of force of 540 gf in the vertical direction without any occurrence of the aforementioned malfunction. Thus, the spindle motor is rotationally driven while satisfactorily resisting against any shock imparted thereto from the outside.

FIG. 5 illustrates the positional relationship between the dynamic pressure applied to the radial sleeve 7 in the thrusting direction and the position assumed by the radial sleeve 7 when the spindle motor is designed with the same dimensions as those of the spindle motor shown in FIG. 4 and it rotates at the same rotational speed as that of the spindle motor shown in FIG. 4, wherein a total thrust clearance $a+a'$ represented by a equation of $(a+a')/A=4.65/10^4$ is 10 $\mu$m as shown in FIG. 5, both the upper and lower thrust forces $F_U$ and $F_L$ are set to a very small value as represented by an equation of $F_U=F_L=21$ gf. As is apparent from FIG. 4 and FIG. 5, the rigidity of the thrust bearing is largely affected by the clearance of the thrust bearing.

In case that the spindle motor is practically used while the stationary shaft is held with a horizontal attitude, since the weight of the rotating assembly is exerted on both the thrust plates 5 and 8, the positional deviation $\delta$ should be adequately adjusted in such a manner that the thrust force $F_U$ is reduced to zero, as represented by the equation of $F_U=0$.

Owing to the fact that the spring washer 3 interposed between the fixing nut 1 and the upper thrust plate 5 is largely deformed by the tightening force generated by threadably tightening the fixing nut 1 much more than ordinary washers but has little plastic deformation, an adequate magnitude of tightening force can be maintained within a wide temperature range. In case that a linear expansion coefficient of each of three bearing components (the two thrust plates 5 and 8 and the radial bearing member 6) on the stationary side is a half or less of that of the stationary shaft like in the aforementioned embodiment, there is a possibility that the fixing nut 1 is loosened as the environmental temperature is elevated at the time of assembly, even though it is within the maintenance temperature or the working temperature. On the contrary, when the environmental temperature is lowered, the fixing nut 1 is tightened with a large magnitude of tightening force, as large as several times to several ten times compared with the tightening force appearing at the time of assembling, whereby the thrust plate 5 is deformed to such an extent that it cannot maintain a predetermined clearance. This is because deformation of the thrust plate 5 attributable to the temperature variation is larger than the deformation of the same attributable to the tightening force applied to a tightening article or an article to be tightened.

Therefore, when the spring washer, adapted to be largely deformed by tightening as compared with deformation attributable to the temperature variation, is practically used for the spindle motor in that way, undesirable loosening of the fixing nut or undesirable excessive tightening of the same can reliably be prevented, and moreover, the properly assembled state of the spindle motor can be maintained within the wide temperature range even though the fixing nut 1 is tightened with a considerably small magnitude of tightening torque much more than the case that it is usually tightened. It should be noted that the present invention should not be limited only to the spring washer. Any type of alternative washer may be employed for the spindle motor, provided that it is proven that it is largely deformed with the tightening force given by the fixing nut 1, much more than an ordinary flat washer, but it has little plastic deformation. It should be added that the foregoing embodiment hah been exemplified by a combination made among the upper and lower thrust plates 5 and 8, the radial bearing member 6 and the radial sleeve 7, each of which is a molded ceramic material. However, the material employed for each of these components should not be limited to only ceramic materials. In some cases, only sliding portions may be prepared using a ceramic material. At any rate, at least the sliding portions should be prepared using a ceramic material. Incidentally, the working temperature range referred to herein represents the temperature range the spindle motor is rotationally driven. Usually, it is within the range of 0° C. to about 70° C.

Advantageous Effects of the Invention

As is apparent from the above description according to the present invention, the following advantageous effects are obtainable with the spindle motor of the present invention. (1) Since the perpendicularity of the outer circumferential surface of the radial bearing member relative to one of the surfaces of one thrust plate can be exactly settled at the time of assembly, the assembling operation can be easily achieved with excellent perpendicularity of the sliding surface of the radial dynamic pressure bearing relative to the sliding surface of the thrust dynamic pressure bearing. (2) Since the perpendicularity of the outer circumferential surface of the radial bearing member relative to one of the surfaces of one thrust plate can be provided with a high accuracy, this makes it possible to set each of clearances of the radial dynamic pressure bearing and the thrust dynamic pressure bearing at a small value. Therefore, the loading capacity and the rigidity of each bearing can substantially be improved with the spindle motor of the present invention compared with the spindle motor having the conventional dynamic pressure bearings employed therefor. (3) Since the radial sleeve constituting the rotary side of a dynamic pressure bearing is interposed between the upper and lower thrust plates while a small clearance is maintained therebetween, it exhibits a high rigidity against an exterior force imparted thereto, because it is retained in the clamped state with a large magnitude of force during rotation of the spindle motor not only from above but also from below. (4) In the contrast with the conventional spindle motor, there is no need of giving a preload to the thrust bearing in order to improve the rigidity of the thrust bearing. In addition, since the load to be borne by the thrust bearing can be reduced to a substantially zero level while it is held in the stationary state, torque loss of the thrust bearing can be reduced. Since damage arising at contact locations when bearing components come in contact with each other like at the time of start and stop of the rotation of the spindle motor, can be substantially reduced, the durability of the spindle motor of the present invention is excellent as compared with the conventional spindle motor. (5) A member such as a spring washer or the like, adapted to be largely deformed by a tightening force much more than a flat washer, and exhibiting little plastic deformation, is interposed between the fixing nut and the thrust plate located on the stationary side or the bearing. This makes it possible to maintain the tightening force of the fixing nut at a substantially constant level within a wide temperature range, and moreover, provided an excellent bearing performance within the wide temperature range. In addition, there is no possibility that cracks or breakage occurs on one of the surfaces of the thrust plate located opposite to the stepped part of the stationary shaft.

What is claimed is:

1. A spindle-motor, comprising:

a cylindrical radial bearing member having opposite end surfaces and an outer circumferential surface, said outer circumferential surface comprising a sliding portion and at least said sliding portion comprising a ceramic material;

two thrust plates in direct contact with said opposite end surfaces of said radial bearing member, said thrust plates having thrust plate surfaces, said thrust plate surfaces comprising sliding portions, and at least said sliding portions comprising a ceramic material;

wherein said cylindrical radial bearing member and said two thrust plates together form a stationary member having a through hole, said stationary member is fixed to a stationary shaft extending through said through hole by a fixing member, and a stator core is mounted on said stationary member;

a cylindrical radial sleeve having an outer circumferential surface, an inner circumferential surface and opposite end surfaces rotatably supported by said outer circumferential surface of said cylindrical radial bearing member and said thrust plate surfaces of said thrust plates, said thrust plate surfaces facing said opposite end surfaces of said cylindrical radial sleeve, and said surfaces of said cylindrical radial sleeve having sliding portions, and at least said sliding portions comprising a ceramic material;

wherein a plurality of dynamic pressure generating grooves are formed on one of said opposite end surfaces of said cylindrical radial sleeve and said thrust plate surfaces of said thrust plates, and wherein said cylindrical radial bearing member, said thrust plates and said cylindrical radial sleeve together form a radial pneumatic dynamic pressure bearing and thrust pneumatic dynamic pressure bearings; and a rotating member disposed around and integral with said outer circumferential surface of said cylindrical radial sleeve, said rotating member having a rotor magnet fixed thereto so as to face said stator core, and said rotor magnet and said stator core together forming a motor section;

wherein $(a+a')/A < (b+b')/L$, where $(a+a')$ is a total thrust clearance between said opposite end surfaces of said cylindrical radial sleeve and said thrust plate surfaces, $A$ is the diameter of each of said thrust plate surfaces, $(b+b')$ is a total clearance between said outer circumferential surface of said cylindrical radial bearing member and said inner circumferential surface of said cylindrical radial sleeve, and $L$ is the axial length of said cylindrical radial sleeve.

2. The spindle motor of claim 1, wherein $(b+b')/B < 5/10^4$, where $B$ is the outer diameter of said outer circumferential surface of said cylindrical radial bearing member.

3. The spindle motor of claim 2, wherein $(a+a')/A < 2.5/10^4$.

4. The spindle motor of claim 1, wherein $(a+a')/A < 2.5/10^4$.

5. The spindle motor of claim 1, wherein said stationary member is fixed to said stationary shaft by said fixing member being disposed on said stationary shaft with a spring washer interposed between said fixing member and one of said thrust plates, said spring washer having the properties of minimal plastic deformation and greater deformation under force than a flat washer.

6. The spindle motor of claim 1, wherein said stator core and said rotor magnet have a radial gap therebetween and said motor section comprises means for generating a force approximately equal to and in a direction opposite to the thrust load due to weight that is supported by said thrust plates.

7. The spindle motor of claim 6, wherein said thrust load due to weight comprises said rotating member.

8. The spindle motor of claim 1, wherein said stator core is positionally offset from the magnetic center of said rotor magnet in the axial direction.

* * * * *